US012083993B2

(12) United States Patent
Crandall

(10) Patent No.: US 12,083,993 B2
(45) Date of Patent: Sep. 10, 2024

(54) BRACKETS, SYSTEMS, AND RELATED METHODS

(71) Applicant: Robert Crandall, Yorba Linda, CA (US)

(72) Inventor: Robert Crandall, Yorba Linda, CA (US)

(73) Assignee: Robert Crandall, Yorba Linda, CA (US)

( * ) Notice: Subject to any disclaimer, the term of this patent is extended or adjusted under 35 U.S.C. 154(b) by 335 days.

(21) Appl. No.: 17/491,782

(22) Filed: Oct. 1, 2021

(65) Prior Publication Data

US 2022/0105870 A1 Apr. 7, 2022

Related U.S. Application Data

(60) Provisional application No. 63/086,371, filed on Oct. 1, 2020.

(51) Int. Cl.
*B60R 3/00* (2006.01)
(52) U.S. Cl.
CPC .................................. *B60R 3/002* (2013.01)
(58) Field of Classification Search
CPC .......... B60R 3/00; B60R 3/002; F16M 13/00; F16M 13/022; F16B 39/32
See application file for complete search history.

(56) References Cited

U.S. PATENT DOCUMENTS

| | | | | |
|---|---|---|---|---|
| 4,058,334 A | * | 11/1977 | Prather | H02B 1/06 292/241 |
| 4,974,274 A | * | 12/1990 | Compton | B21J 15/12 29/521 |
| 6,227,782 B1 | * | 5/2001 | Bowling | F16B 35/048 411/114 |
| 10,428,858 B1 | * | 10/2019 | Lombardo | F16B 17/008 |
| 2002/0090277 A1 | * | 7/2002 | LeVey | F16B 37/042 411/172 |
| 2013/0294861 A1 | * | 11/2013 | Wiffen | F16B 21/04 411/141 |
| 2020/0130762 A1 | * | 4/2020 | Crandall | B62D 65/16 |
| 2020/0339204 A1 | * | 10/2020 | Crandall | B62D 21/155 |

* cited by examiner

*Primary Examiner* — Monica E Millner
(74) *Attorney, Agent, or Firm* — Alumen IP Law PC

(57) ABSTRACT

A mounting assembly for attaching a first object or structure to a second object or structure in a blind installation. The mounting assembly having a frame locking bolt (FLB) that includes a bolt head flange and a frame bolt with a bolt head. The bolt head and the bolt head flange are configured to locate within an enclosed space and not accessible for torquing. The bolt head flange having a first edge and a second edge and wherein the second edge is configured to locate next to a solid wall inside the enclosed space to provide resistance for threading a frame nut onto the shank of the frame bolt to secure the first object to the second object.

21 Claims, 6 Drawing Sheets

BRACKETS, SYSTEMS, AND RELATED METHODS

FIELD OF ART

The field of the invention relates to systems and methods for mounting a first object or structure to a second object or structure in a blind installation using brackets and bolts and related methods.

BACKGROUND

Vehicles provide transportation for people and objects over distances. Vehicles can be used both on-road and off-road. Certain vehicles, such as SUVs, crossovers, and 4×4 trucks, typically include sufficient ground clearance or height to go off-road or over obstacles. As such, these vehicles may present a challenge for entry and exit into the passenger compartment. In these types of vehicles, the passenger compartment or compartments may be located at a height, which makes entry and exit challenging for children, the elderly or infirmed and even normal abled-body adults. Thus, running boards may be used to aid drivers and occupants of vehicles to get in and out and are therefore valuable. In some instances, running boards may be used as an accessory or for aesthetic and less so for their utility. Regardless of the reasons, these installations require brackets and fasteners and, in some instances, blind installations.

When mounting a first object or structure to a second object or structure, such as a cabinet to a wall, a panel to housing, a frame to a chassis, etc., brackets and/or fasteners are required. In some instances, these installations also require blind installations.

SUMMARY

Aspects of the present invention include a mounting assembly comprising a frame locking bolt (FLB) for attaching a first object or structure to a second object or structure. The first object and the second object can embody any number of features, devices, or components with at least the first object or the second object comprising an enclosed space that calls for the installation to be a blind installation. For example, the first object can be a running board for a vehicle and the second object can be part of the vehicle that has the enclosed space that calls for a blind installation.

An exemplary mounting assembly can comprise a bolt head flange comprising an opening having a shank of a flange bolt passing through the opening and a bolt head of the flange bolt secured to the bolt head flange; said bolt head flange comprising a first side edge and a second side edge, said first side edge having a straight edge section oriented at an angle to a straight edge section of the second edge; a bracket having a slot formed at an edge and having the shank of the flange bolt located in a gap of the slot; and wherein the shank has a centerline defining an axis of rotation, wherein the second edge has first section with a first turning radius R1 relative to the axis of rotation and a second section with a second turning radius R2 relative to the axis of rotation, and wherein R2 is greater than R1.

The bracket can have a first mounting section having the slot and a second mounting section with an opening.

The bracket can be flat with a single planar surface. In other examples, the bracket can have a mid-section and two end sections on two different planes.

The bracket can be omitted and the frame locking bolt can be used to attached two different structures or objects without the bracket.

A hold-down nut with a threaded bore can be secured to the second mounting section and the threaded bore can be aligned to the opening of the second mounting section.

The first mounting section and the second mounting section can be parallel to one another. For example, each section can have a planar surface and the two planar surfaces can be on different planes that are parallel to one another.

The mounting assembly can further comprise an intermediate section located between the first mounting section and the second mounting section, and wherein the intermediate section can have a vertical wall surface or an inclined wall surface.

The bolt head flange can have a first section and a second section. The second section can comprise a flange or a tab. The flange or tab can have a side edge and an adjoining edge that are located radially of an edge on the first section.

The radial reference can be understood as being located radially of an axis defined by the first edge of the first section.

A step can be provided between the first section and the second section. Thus, the bolt head flange can have a thickness that is thicker at the step than a thickness at the first section and the second section.

The mounting assembly can further comprise a spacer having a bore and the shank can be located in the bore.

The mounting assembly can further comprise a washer with a plurality teeth engaging the shank and supporting the spacer.

When a hold-down bolt is used, the bolt can be secured to the bracket instead of the hold-down nut.

In alternative embodiments, a frame nut be secured to the bolt head flange and the shank of the frame bolt can project into the enclosed space to engage with the frame nut, similar to the hold-down bolt arrangement shown in the various figures.

A frame nut can be threaded to the shank and supporting the washer and the spacer.

The spacer can have at least two different plate sections with different outer dimensions.

A further aspect of the invention comprises a running board for a vehicle comprising: an elongated support member having two ends. a top wall for supporting a passenger, and an opening; a mounting assembly secured to the elongated support member, said mounting assembly comprising a bolt head flange located above, elevation-wise, the top wall of the elongated support member, the mounting assembly further comprising: a shank of a flange bolt passing through an opening of the bolt head flange and a bolt head of the flange bolt secured to the bolt head flange; said bolt head flange comprising a first side edge and a second side edge, said first side edge having a straight edge section oriented at an angle to a straight edge section of the second edge; a bracket having a slot formed at an edge and having the shank of the flange bolt located in a gap of the slot; and wherein the shank has a centerline defining an axis of rotation, wherein the second edge has first section with a first turning radius R1 relative to the axis of rotation and a second section with a second turning radius R2 relative to the axis of rotation, and wherein R2 is greater than R1.

A still yet further aspect of the invention is a method of mounting a first object to a second object in a blind installation, said second object having an enclosed space preventing access to a frame bolt having an axis of rotation, said method comprising: placing bolt head flange having the frame bolt attached therethrough in through an opening so that a bolt head of the frame bolt and the bolt head flange having a first edge and a second edge angled to one another are located in the enclosed space; locating the second edge of the bolt head flange adjacent a wall inside the enclosed space so that a distance from the wall to the axis of rotation is R1, and wherein an edge section on the second edge has a turning radius R2, which is greater than R1.

The method can further comprise placing a spacer onto the shank and placing the shank through an opening of the first object.

The method can further comprise threading a frame nut to the shank and tightening the frame nut against the first object.

The method can further comprise passing the shank through a slot of a bracket, the bracket can be located between the first object and the second object.

Methods of making and of using the mounting assemblies and their components, such as frame locking bolts, described elsewhere herein are understood to be within the scope of the present disclosure. The present application includes methods of using and assembling mounting assemblies to secure a first object or structure to a second object or structure.

BRIEF DESCRIPTION OF THE DRAWINGS

These and other features and advantages of the present devices, systems, and methods will become appreciated as the same becomes better understood with reference to the specification, claims and appended drawings wherein:

DETAILED DESCRIPTION

The detailed description set forth below in connection with the appended drawings is intended as a description of the presently preferred embodiments devices, systems, and methods involving a first object or structure attached to a second object or structure using a frame locking bolt (FLB) in a blind installation and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
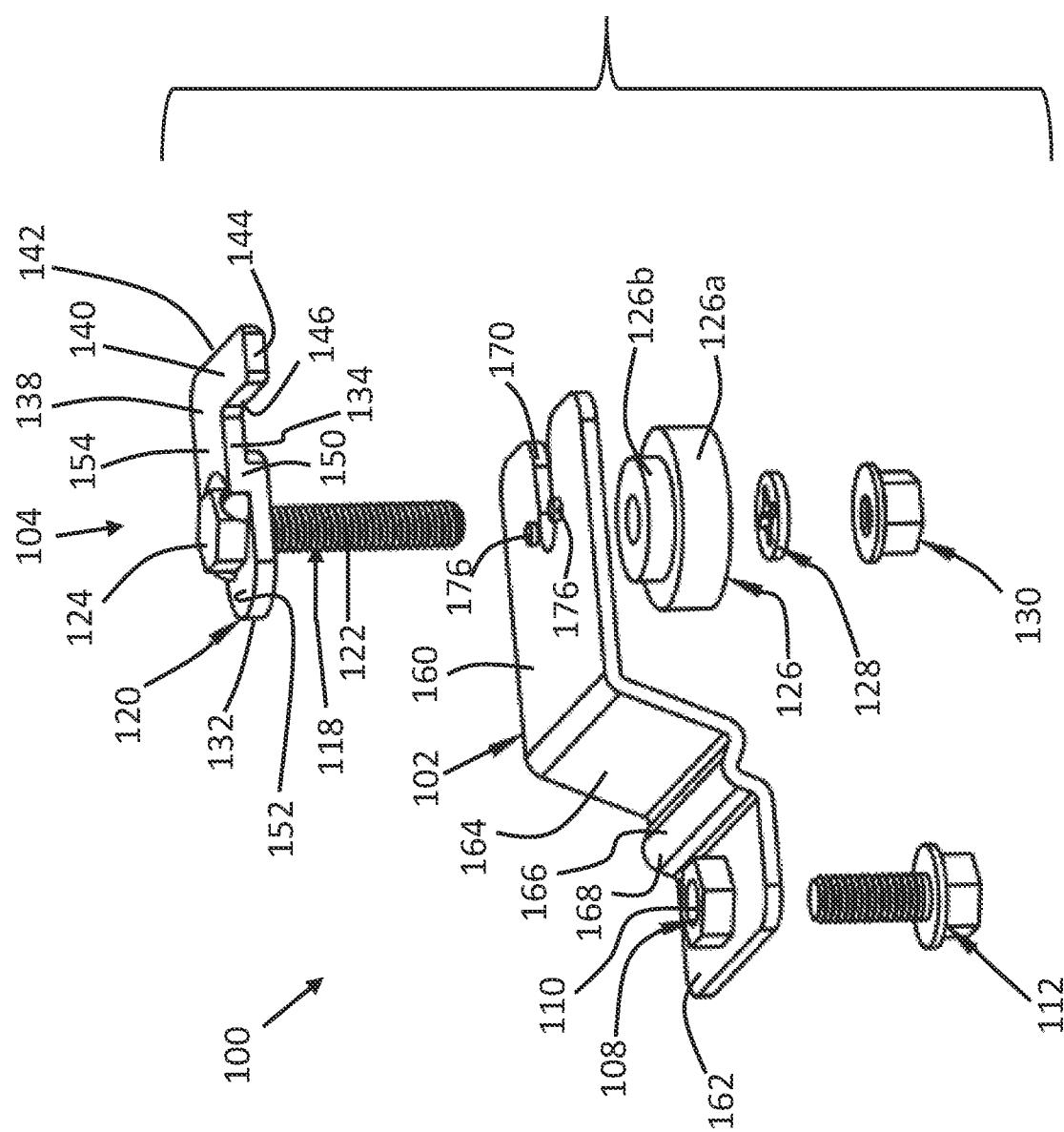
FIG. 1 is an exploded perspective view of a mounting assembly comprising a frame locking bolt.

With reference now to FIG. 1, an exploded view of a mounting assembly 100 provided in accordance with aspects of the invention is shown. The mounting assembly has a bracket 102 and a frame locking bolt 104. A hold-down nut 108 is secured to the bracket 102, such as by welding, and the threaded through bore 110 of the hold-down nut 108 is aligned with an opening on the bracket 102. A hold-down bolt 112 can threadedly engage the hold-down nut 108, to secure the bracket 102 to a structure, such as to a flange, to another bracket, to a wall, to a frame, to a chassis, etc.

The frame locking bolt (FLB) 104 is shown comprising a frame bolt 118 secured to a bolt head flange 120. For example, the bolt head flange 120 can have an opening and the threaded shank 122 of the frame bolt 118 projected through the opening. The bolt head 124 of the frame bolt 118 can then be welded to the bolt head flange 120 so that the bolt head and therefore the frame bolt is fixed relative to the bolt head flange and not rotatable relative to one another. The weld can be continuous or can be spaced apart tack-welds. The FLB 104 further comprises a spacer 126, a washer 128, such as a self-retaining washer that interacts with the threads of the threaded shank 122, and a frame nut 1130, which can have a flange formed therewith. The spacer and the washer can optionally be omitted. In some examples, the FLB 104 can be used to install a first structure to a second structure without the bracket 102.

The bolt head flange 120 can have a first section 132 where the frame bolt 118 projects through the opening of the flange and the bolt head 124 abuts the surface of the first section 132 and the shank 122 projects through to the opposite side. The first section 122 can have a first edge 134. The first edge 134 can also be considered the opposite edge of the first section 132. A second section 138 of the bolt head flange 120 can extend from the first section 132. The second section 138 can be the section on this side of the bolt head 124 and the first section 132 can be on the opposite side of the bolt head. The second section 138 can have second edge 142. The second section can also have a tab or a flange 140. The tab or flange 140 extends the length of the second edge 142 so that the length of the second edge is longer or wider than the width of the first section 132. Thus, part of the second edge 142 can extend radially of the first edge 134. In an example, the tab 140 has a side edge 144 and an adjoining edge 146, and wherein the side edge 144 and the adjoining edge 146 can be located radially of the first edge 134.

In an example, the first edge 134 of the first section 132 can have a linear section and the second edge 142 of the second section 138 can have a linear section and the two can be generally orthogonal to one another. The bolt head flange 120 can be formed by cold working or cold forming a metal sheet with sufficient thickness to provide sufficient properties, such as rigidity and stiffness to physically hold a first object to a second object. For example, a metal sheet can be stamped and then pressed to a desired shape. In some examples, some machining may be applied to form the final desired shape.

As shown, the bolt head flange 116 has a step 150. That is, the first section 132 can have an upper surface 152 and the second section 138 can have an upper surface 154 and wherein the two upper surfaces 152, 154 are not on the same plane. In an example, the two upper surfaces 152, 154 are located on two different planes that are parallel to one another. The step 150 can be provided to accommodate different surfaces or to accommodate different features to be bound or held by the mounting assembly 100. In other examples, different steps or multiple steps can be provided.

The flange 120 has a thickness at the step 150 that is thicker than the thickness at the first section 132 and the second section 154.

The bracket 102, when used, has a first mounting section 160 for engaging with the FLB 104, a second mounting section 162 having an opening for receiving the hold-down bolt 112 and the hold-down nut 108. In some examples, the bracket 102 can be flat or planar. However, for the first mounting section 160 and the second mounting section 162 to contact two surfaces on two different planes, an intermediate section 164 can be provided between the first and second mounting sections 160, 162. In an example, the first and the second mounting sections have surfaces defining planes that are parallel to one another. In some examples, the two mounting sections 160, 162 can be angled to one another instead of parallel. The first and second mounting sections 160, 162 can be selected with parallel surfaces or surfaces that are angled to one another depending on the structures or components that the bracket 102 is intended to fit against or into, such as for use on a home instead of a car. The size of the bracket 102 as well as the rest of the mounting assembly 100 can be selected as appropriate for the application while maintaining key features described herein, such as rigidity and purpose and use of the FLB.

In an example, the intermediate section 164 has an angled surface or is inclined, as opposed to being vertical, relative to the first mounting section 160, the second mounting section 162, or to both mounting sections 160, 162. The slope and the length of the intermediate section 164 can vary for fit with the application in question. For example, when two surfaces to be abutted by the two mounting sections 160, 162 of the bracket 102 are large or wide, the length of the intermediate section 164 can also be sufficiently wide or long in order to bridge the gap called for by the application. In other examples, the intermediate section 164 is vertical and has no slope. Still further, the intermediate section 164 may incorporate a bend, a inflection point, or a stepped feature 166 to change the position of the second mounting section 162 compared to when the intermediate section 164 does not incorporate any bend or inflection point. The bend or inflection point 166 can add structural rigidity by functioning as a reinforcement member, such as a rib, or can accommodate certain physical requirements for the application in question. The bend 166 can also serve to accommodate different mounting requirements.

In the present embodiment, the location of the inflection point, bend, or stepped feature 166 on the intermediate section 164 can be selected to abut or support a structure that the flange 102 is located. For example, the inflection point, bend, or stepped feature 166 can define a surface 168. When the flange 102 is located on a vehicle to attach a running board, as an example, the pinch weld of a unibody vehicle can rest on the surface 168. Said differently, the flange 102 can be located in the mounting space of a vehicle and arranged so that the surface 168 of the inflection point 166 is butted up against the low end of the pinch weld of the vehicle frame. This way, any point load pushing up on the running board, and hence the flange 102, can be distributed over a broader area of the frame to a strong area of the unibody frame.

Figure 2:
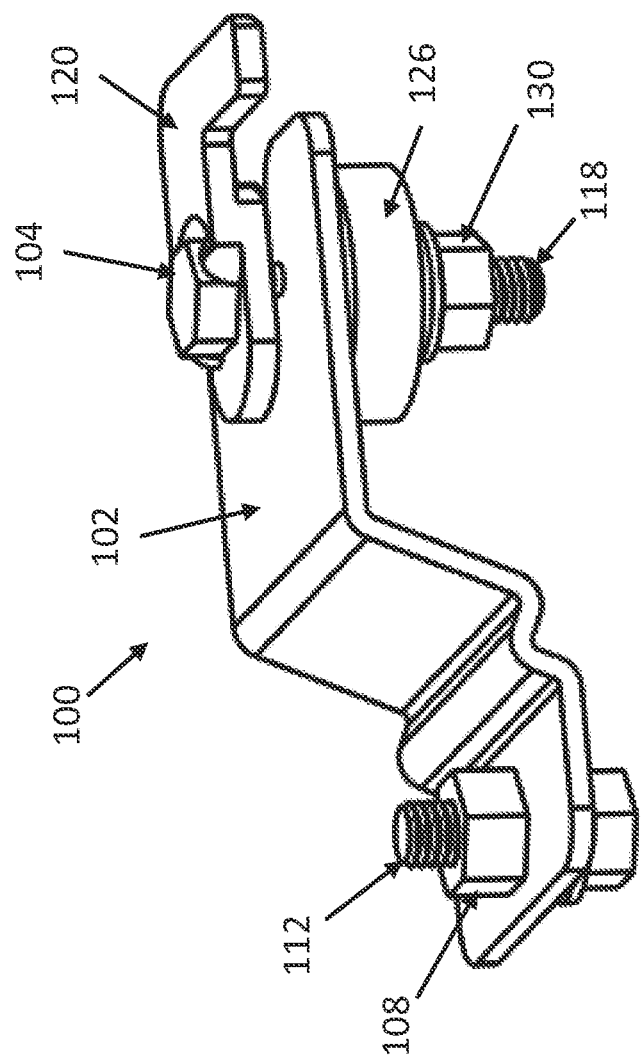
FIG. 2 is a perspective view of the mounting assembly of FIG. 1 in an assembled state.

The first mounting section 160 can have a channel or a slot 170 formed at about a mid-point of the width of the first mounting section 160 to a depth that is about 20% up to about 80% of the length of the first mounting section 160. That is, the first mounting section 160 of the bracket 102 can have an edge and the slot can cut through the edge to form a gap defining the slot. The entrance to the slot 160 may be widened or flared and the width of the slot, such as the gap, may be sufficiently wide to facilitate passing the threaded stem or shank 122 of the frame bolt 118 therein, as shown in FIG. 2. The frame bolt 118, such as the threaded stem or shank 122 of the bolt, may be located anywhere along the length of the slot or channel 170 during initial and/or final assembly. However, the length of the slot 170 can be selected to ensure that the final position of the bolt frame 118 is located at a desired position within the slot of the first mounting section 160.

In an example, one or more beads or projections 176 may be incorporated on the top surface of the first mounting section 160. As shown, a bead or projection 176 may be located on each side of the slot 170. In some examples, a third bead may be incorporated at the end of the slot 170, forming a three point bead-configuration near the end of the slot 170. The outer edges of the beads or projections 176 define a dimension. The beads 176 can project into or be located within a perimeter defining an opening of a blind installation. This in turn sets the location and angular position of the beads within the opening and therefore sets the position of the bracket 102 relative to the opening of the structure for which to perform the installation. In some examples, only one bead 176 is incorporated. Less preferably, no bead is incorporated on the top surface of the first mounting section 160 of the bracket 102. Alignment and positioning of the bracket 102 for the embodiment without any bead can be processed or controlled based on the relative size of the slot 170 and the frame bolt 118, as well as the length or dimension of the first mounting section 160. For example, by selecting the length of the first mounting section 160, the distance between the intermediate section 164 and the edge of the first mounting section at the entrance of the slot can be controlled. This in turn controls the relative position of the intermediate section relative to the opening or other structure of the blind installation.

In an example, the spacer 126 has two distinct round plate sections of different dimensions with a common bore for receiving the threaded shank 122 of the frame bolt 118. As shown, the spacer 126 hare a larger plate section 126a and a smaller plate section 126b. The two plate sections 126a, 126b can help orientate the position of the washer, can provide an overall lighter washer compared to a single large diameter washer, and can provide clearance for adjacent objects by using different shapes, to name a few non-limiting examples. The spacer can be mounted onto the shank 122 and the bore of the spacer 126 can slide or move axially along the length of the threaded stem 122. In some examples, the spacer can have a single large diameter plate or a single small diameter plate, without distinct plate sections of different dimensions.

FIG. 2 is a perspective assembled view of the mounting assembly 100 of FIG. 2, shown without the first and second structures to be assembled together using the mounting assembly 100.

Figure 3:
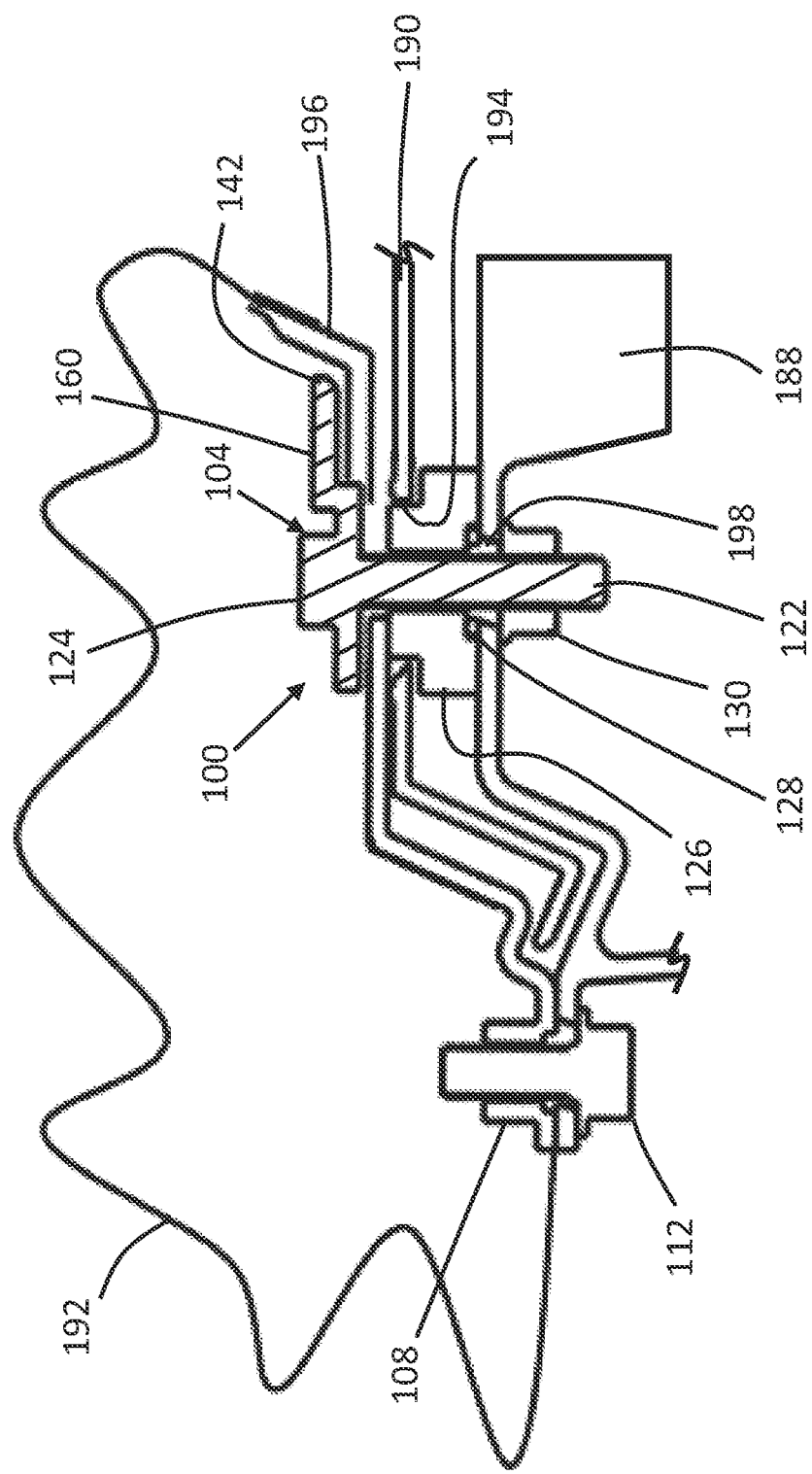
FIG. 3 is a schematic side view of a first object or structure secure to a second object or structure using a mounting assembly of the present invention.

FIG. 3 is a schematic view showing the mounting assembly 100 in use to secure a first structure or object 188 to a second structure or object 190. The first object 188 can embody any number of items, such as a running board, a cabinet, a flange, an extension, a light fixture, a frame, or a housing and should not be viewed as limiting. The second object 190 can embody any number of items or structures, such as a wall of a home, a chassis of a car, a frame of an equipment, or a housing of a mobile device and should not be viewed as limiting as the mounting assembly 100 of the prevent invention may be used to mount most of any two objects or structures together in a blind installation. The second object 190 can be part of or can butt-up against an enclosed space 192 such that the bolt head 124 of the FLB 104, when located in the enclosed space, is not accessible during installation, which is also known as a blind installation.

In use, the FLB 104 can be located in a blind spot or a blind installation. The first mounting section 160 can slip behind the second structure 190. The second structure 190 can have an opening 194. The bolt head flange 120 and the bolt head 124 can pass through the opening 194 and then the threaded shank 122 can slide through the gap of the channel or slot 170 of the first mounting section 160 of the bracket 102. The second edge 142 of the first mounting section 160 can be oriented so that it is closest to a wall 196 that defines part of the enclosed space 192. The wall 196 can be part of the enclosed space and can be part of the second object and in some instances can be rigid or solid. As further discussed below, by orientating the second edge 142 adjacent the wall 196, this orientation of the second edge 142 limits or restricts the bolt head flange 120 from freely rotating as a small degree of rotation during torquing of the frame nut 130 can cause the second edge 142 to abut the wall 196 to prevent further rotation.

Next, the spacer 126 can slide onto the threaded shank 122 with the small flange section 126b of the spacer oriented to project through the opening 194 of the second structure 190. Next, the self-retaining washer 128 can slide onto the threaded shank 122 and seat within a complementary recess of the spacer 126 to hold the spacer onto the threaded shank. The self-retaining washer has teeth that loosely interact with the threads of the threaded shank 122 to avoid freely dislodging from the shank.

Next, the opening 198 of the first object 188 is slid onto the threaded shank 122 and the frame nut 130 is threaded onto the threaded shank 122 to hold the first structure 188 up against the second structure 190. A second bolt or hold-down bolt 112 can then thread into the threaded bore 110 of the second nut 108 at the second section 162 of the bracket 102 to secure another section of the first structure 188 against the bracket 102. The second bolt or hold-down bolt 112 and the frame nut 130 are then tightened to a final torque to secure the first structure to the second structure in a blind installation.

Figure 4:
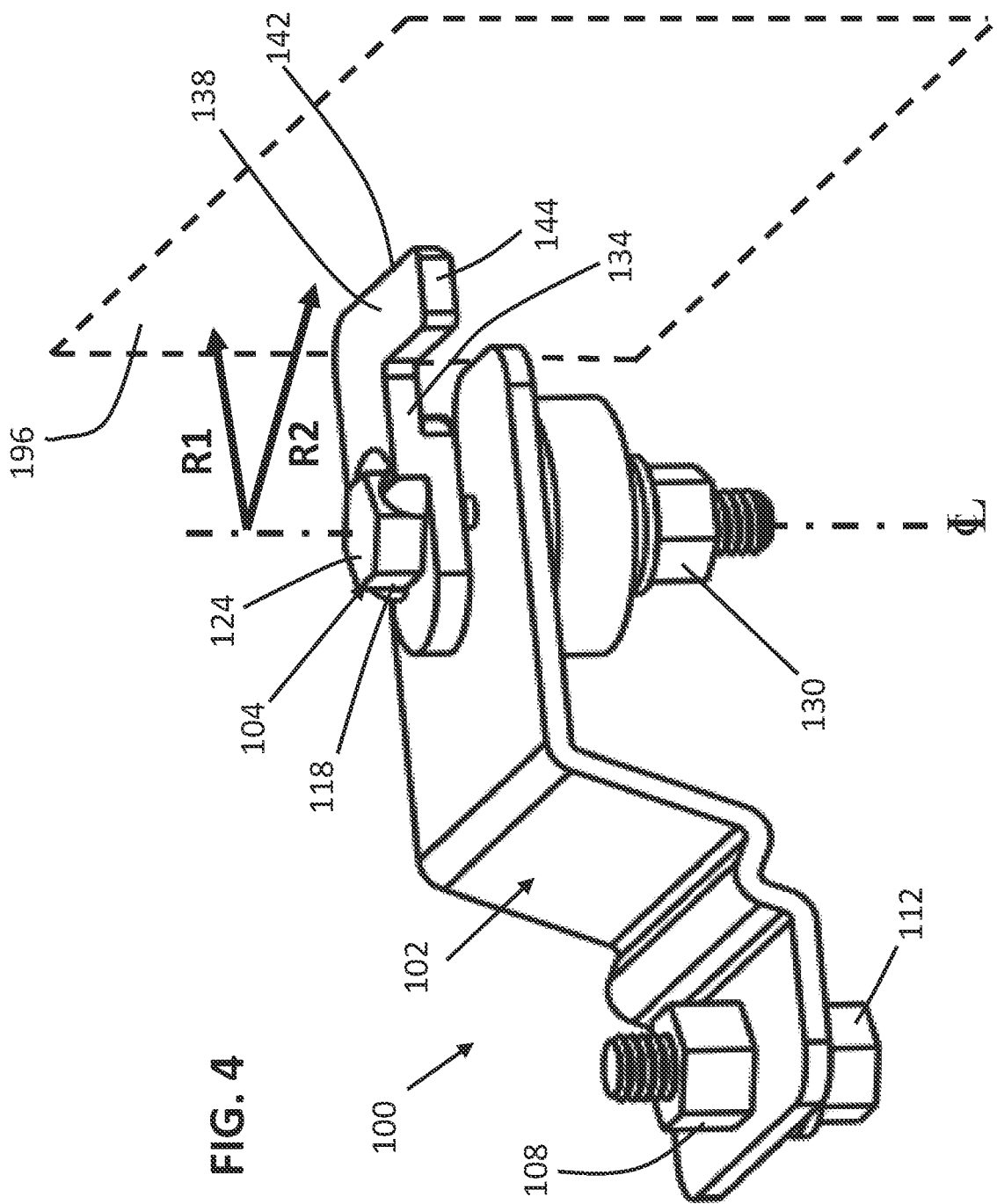
FIG. 4 is a perspective view of the mounting assembly of FIG. 1 shown adjacent a wall, which is usable by the frame locking bolt to provide resistance.

With reference now to FIG. 4, the assembled mounting assembly 100 of FIG. 2 is shown adjacent a wall 196, which can represent any number of structures of a blind installation. The mounting assembly 100 is shown without the first structure or object and second structure or object for clarity. As shown, the frame bolt 118 has a centerline $\mathcal{C}_L$ which is also the rotational axis of the bolt 118. Thus, if the frame bolt 118 rotates, the bolt head flange 120 will also rotate with the frame bolt 118 since the bolt head 124 is welded to the bolt head flange 120.

However, since the shape bolt head flange 120 is not round, different parts or sections of the bolt head flange 120 will have different turning radiuses. In the view shown, the shortest distance to the second edge 142 of the second section 138 from the frame bolt centerline $\mathcal{C}_L$ has a turning radius R1, which is less than longest distance to the second edge 142 of the second section 138 from the frame bolt centerline $\mathcal{C}_L$, which has a turning radius R2. Thus, since R2 is larger than R1, any rotation of the frame locking bolt 104 during torquing of the frame nut 130 will cause the longest distance with the turning radius R2 to hit the wall 196, which provides the resistance needed to fully torque the frame nut 130 to the threaded shank 122 of the frame bolt 118. For discussion purposes, the shortest distance between the rotational axis and the wall can be called R0 and the second section 138 can have turning radiuses of R1, which is the shortest distance between the rotational axis and the second edge, and R2, R3, R4, etc., which can be longer or larger than R1 and R0.

A similar condition occurs when the frame nut 130 loosens from the threaded shank 122. Another section of the bolt head flange 120 can have a turning radius that is s is larger or longer than R0 and R1. Thus, when the frame nut 130 rotates, the section with the turning radius R2, R3, or R4 can contact the wall 196 to then provide the resistance needed to fully loosen the frame nut 130 from the threaded shank 122.

As described hereinabove, the mounting assembly 100 of the present invention is configured to secure a first object or structure to a second object or structure in a blind installation. The unique FLB 104 of the present invention uses a bolt head flange 124 with a non-circular perimeter so that different sections of the outer or second edge 142 of the bolt head flange 124 will have different turning radiuses, from a minimum turning radius of R1 to at least one larger turning radius R2. In other examples, the shape of the bolt head flange 124 may create additional turning radiuses, such as R3, R4, etc., which are larger than R1. These different turning radiuses can be used to limit rotation of the FLB 104, such as by placing the second edge 142 of the bolt head flange 120 adjacent a wall 196 that forms at least part of the blind installation so that the second edge abuts the wall to provide the needed resistance for tightening or loosening the frame nut 130 onto or off the threaded shank 122. In some examples a regular nut and a separate washer may be used instead of the flange nut.

In an example, the first structure or object 188 is a running board for a vehicle, which can be called a support device for supporting a vehicle passenger. The second structure or object can be a chassis or a frame component of a vehicle. The mounting assembly 100 can therefore be used to attach the running board to a vehicle. U.S. Pat. No. 9,333,919, which is expressly incorporated herein by reference in its entirety, discloses features of support devices and lighting elements usable with the support devices. Support members can be understood in the context on the incorporated reference. For example, mounting brackets and steps can be attached and fixed to an elongated member or be adjustable along the length of the elongated member, as described in the '919 patent. Additionally, U.S. application Ser. No. 16/059,997, filed Aug. 9, 2018, published as U.S. No. 2019/0047477, which is expressly incorporated herein by reference in its entirety, discloses features of steps for fitment with a vehicle. The features of the steps can be applied to the support device of the present disclosure.

Figure 5:
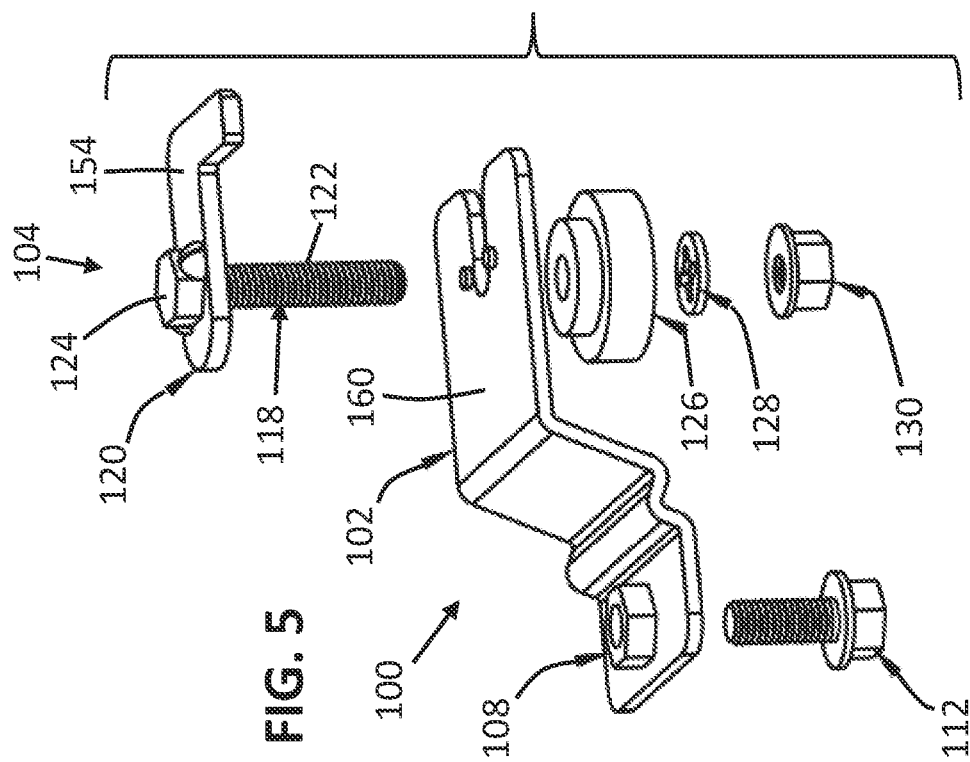
FIG. 5 is an exploded perspective view of a mounting assembly according to an alternative embodiment.

With reference now to FIG. 5, a mounting assembly 100 provided in accordance with further aspects of the invention is shown. The mounting assembly 100 is shown in an exploded view and shares many similarities with the mounting assembly of FIGS. 1-4, including an FLB 104, a bracket 102, a spacer 126, a washer, 128, a frame nut 130, and a hold-down bolt 112, among others. The present mounting assembly differs from the mounting assembly of FIGS. 1-4 to some degree. In the present mounting assembly 100, the bolt head flange 120 has a single planar upper surface 154 and does not incorporate any step 150 (FIG. 1). Thus, the present bolt head flange 120 of the mounting assembly 100 may be used to mount a first structure to a second structure that does not require the offset on the bolt head flange 120 for accommodating a lip or surface within the enclosed space.

Figure 6:
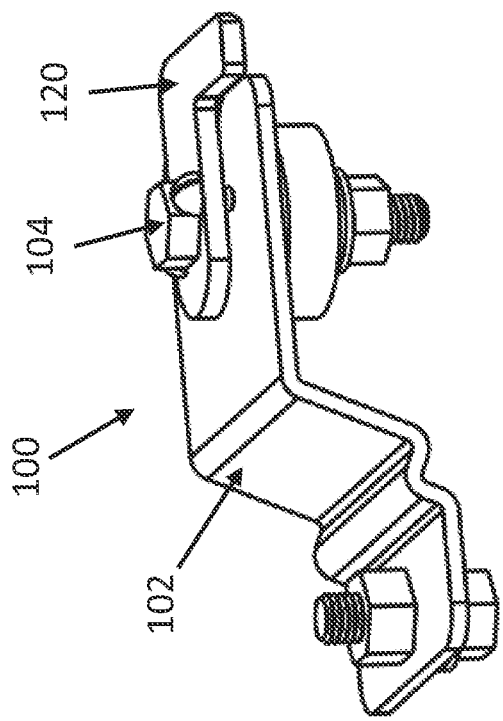
FIG. 6 is a perspective view of the mounting assembly of FIG. 5 in an assembled state.

FIG. 6 is a perspective assembled view of the mounting assembly 100 of FIG. 5, shown away from first and second structures to be assembled together using the mounting assembly of FIG. 5. For example, the present mounting assembly 100 may be used as described with reference to FIG. 3.

Figure 7:
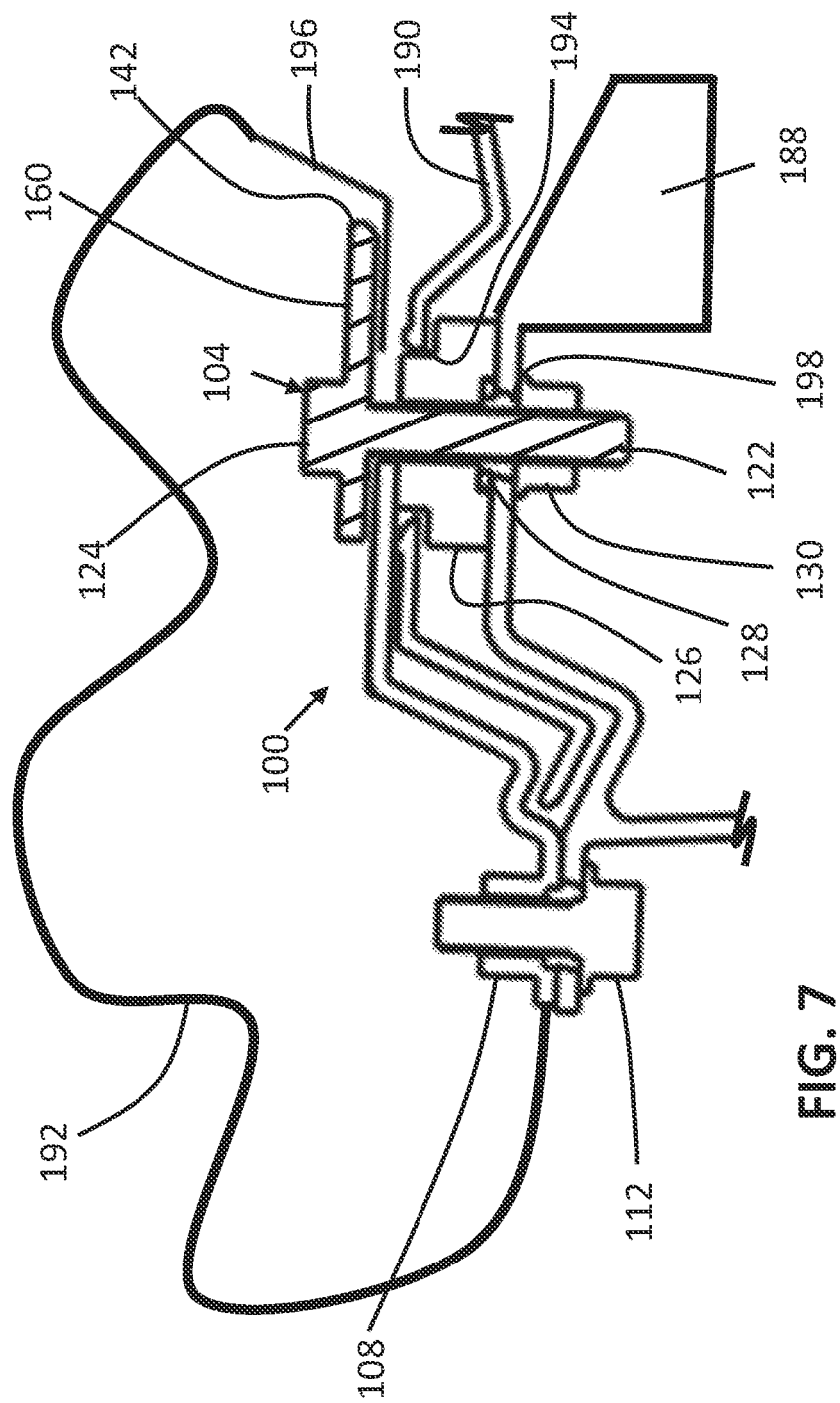
FIG. 7 is a schematic side view of a first object or structure secure to a second object or structure using the mounting assembly of FIGS. 5 and 6.

FIG. 7 is a schematic side view of a first object or structure secure to a second object or structure using the mounting assembly of FIGS. 5 and 6. FIG. 7 shows similar features and components as FIG. 3, but with the mounting assembly of FIGS. 5 and 6.

Methods of making and of using the mounting assemblies and their components, such as frame locking bolts, described elsewhere herein are understood to be within the scope of the present disclosure. The present application includes methods of using and assembling mounting assemblies to secure a first object or structure to a second object or structure.

Although limited embodiments of support devices and assemblies and their components have been specifically described and illustrated herein, many modifications and variations will be apparent to those skilled in the art. For example, the various mounting assemblies may have different shapes or sizes but still use FLBs with abutting edges to provide resistance for torquing in a blind installation. Furthermore, it is understood and contemplated that features specifically discussed for one mounting assembly embodiment may be adopted for inclusion with another mounting assembly, provided the functions are compatible. Accordingly, it is to be understood that the support assemblies and their components constructed according to principles of the disclosed devices, systems, and methods may be embodied other than as specifically described herein. The disclosure is also defined in the following claims.

What is claimed is:

1. A mounting assembly comprising:
a bolt head flange comprising an opening having a shank of a flange bolt passing through the opening and a bolt head of the flange bolt secured to the bolt head flange; said bolt head flange comprising a first side edge and a second side edge, said first side edge having a straight edge section oriented at an angle to a straight edge section of the second edge;
a bracket having a slot formed at an edge and having the shank of the flange bolt located in a gap of the slot; and
wherein the shank has a centerline defining an axis of rotation, wherein the second edge has first section with a first turning radius R1 relative to the axis of rotation and a second section with a second turning radius R2 relative to the axis of rotation, and wherein R2 is greater than R1.

2. The mounting assembly of claim 1, wherein the bracket has a first mounting section with the slot and a second mounting section with an opening, and wherein a hold-down nut with a threaded bore is secured to the second mounting section and the threaded bore is aligned to the opening of the second mounting section.

3. The mounting assembly of claim 2, wherein the first mounting section and the second mounting section have planar surfaces that are parallel to one another.

4. The mounting assembly of claim 3, further comprising an intermediate section located between the first mounting section and the second mounting section, and wherein the intermediate section has a vertical wall surface or an inclined wall surface.

5. The mounting assembly of claim 1, wherein the bolt head flange has a first section and a second section.

6. The mounting assembly of claim 5, wherein the second section has a tab having a side edge and an adjoining edge located radially of the first side edge.

7. The mounting assembly of claim 5, wherein a step is located between the first section and the second section.

8. The mounting assembly of claim 1, further comprising a spacer having a bore and the shank is in the bore.

9. The mounting assembly of claim 8, further comprising a washer with a plurality teeth engaging the shank and supporting the spacer and wherein a frame nut is threaded to the shank and supporting the washer and the spacer.

10. The mounting assembly of claim 8, wherein the spacer has at least two different plate sections with different outer dimensions.

11. The mounting assembly of claim 1, wherein the shank is located in an opening of a first object and the bott head flange is located in an opening of a second object to connect the first object to the second object.

12. The mounting assembly of claim 11, wherein the first object is a running board having an elongated support member having two ends and a top wall for supporting a passenger.

13. The mounting assembly of claim 12, further comprising a step attached to the elongated support member, the step having a surface for stepping on by a user and the surface is located below the elongated support member.

14. The mounting assembly of claim 11, further comprising a spacer located between the first object and the second object, and wherein the shank projects through a bore of the spacer.

15. The mounting assembly of claim 14, wherein the second edge contacts a surface of the second object.

16. The mounting assembly of claim 1, wherein the bolt head of the flange bolt is welded to the bolt head flange.

17. A mounting assembly comprising:
a bolt head flange comprising an opening having a shank of a flange bolt passing through the opening and a bolt head of the flange bolt secured to the bolt head flange; said bolt head flange comprising a first side edge and a second side edge, said first side edge having a straight edge section oriented at an angle to a straight edge section of the second edge;
a bracket having a slot formed at an edge and having the shank of the flange bolt located in a gap of the slot;
a spacer located below, elevation-wise, the bracket and having the shank of the flange bolt passing through a bore of the spacer; and
wherein the shank has a centerline defining an axis of rotation, wherein the second edge has first section with a first turning radius R1 relative to the axis of rotation and a second section with a second turning radius R2 relative to the axis of rotation.

18. The mounting assembly of claim 17, wherein R2 is greater than R1.

19. The mounting assembly of claim 17, further comprising a nut threaded to the shank, and wherein the nut is located below, elevation-wise, the spacer.

20. The mounting assembly of claim 17, wherein the bracket comprises a first mounting section having a surface with the slot and a second mounting section having a surface located below, elevation-wise, the surface of the first mounting section, and wherein a hold down nut is secured to the second mounting section.

21. The mounting assembly of claim 20, further comprising a self-retaining washer having a through opening and wherein the shank passes through the through opening.

* * * * *